(12) United States Patent
Joo et al.

(10) Patent No.: US 9,935,555 B2
(45) Date of Patent: Apr. 3, 2018

(54) POWER SUPPLY APPARATUS AND POWER SUPPLY METHOD THEREOF

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 15/086,496

(22) Filed: Mar. 31, 2016

(65) Prior Publication Data

US 2016/0322905 A1 Nov. 3, 2016

(30) Foreign Application Priority Data

Apr. 29, 2015 (KR) ........................ 10-2015-0060548

(51) Int. Cl.
*H02M 3/335* (2006.01)
*H02M 1/00* (2006.01)

(52) U.S. Cl.
CPC .................. *H02M 3/33507* (2013.01); *H02M 2001/0032* (2013.01); *Y02B 70/16* (2013.01)

(58) Field of Classification Search
CPC ......... H02M 2001/0032; H02M 3/156; H02M 2001/0025; H02M 3/33507; H02M 3/33523; H02M 3/33584; H02M 2001/007; H02M 3/1588; H02M 1/14; H02M 1/15; H02M 2001/0048; H02M 3/3378; H02M 2003/1566

See application file for complete search history.

(56) References Cited

U.S. PATENT DOCUMENTS

2005/0078492 A1* 4/2005 Takahashi ......... H02M 3/33523
363/21.15

FOREIGN PATENT DOCUMENTS

KR 10-1130216 B1 3/2012

* cited by examiner

*Primary Examiner* — Henry Lee, III
(74) *Attorney, Agent, or Firm* — Sughrue Mion, PLLC (57) ABSTRACT

A power supply apparatus and a method for controlling the power supply apparatus are provided. The power supply apparatus drives an electronic apparatus which may operate in a first mode or a second mode. The power supply includes an input voltage generator that generates an input voltage; an output voltage generator that generates a first output voltage by using the input voltage, and supplies the output voltage to the electronic apparatus; and a detector that determines the mode of the electronic apparatus by detecting a load of the electronic apparatus, and outputs a control signal to the output voltage generator in response to the mode of the electronic apparatus changing from the first mode to the second mode. In response to receiving the control signal, the output voltage generator generates a second output voltage that corresponds to the second mode.

14 Claims, 6 Drawing Sheets

POWER SUPPLY APPARATUS AND POWER SUPPLY METHOD THEREOF

CROSS-REFERENCE TO RELATED APPLICATION

This application claims priority from Korean Patent Application No. 10-2015-0060548, filed on Apr. 29, 2015, in the Korean Intellectual Property Office, the disclosure of which is incorporated herein by reference in its entirety.

BACKGROUND

1. Field

Apparatuses and methods consistent with exemplary embodiments relate to a power supply apparatus and a power supply method thereof, and more particularly, to a power supply apparatus for driving an electronic apparatus and a power supply method thereof.

2. Description of the Related Art

Electronic apparatuses, such as monitors or televisions, may enter an operating mode and perform an operation according to the operating mode in response to an external restart signal being input in a standby mode. On other hand, when the apparatuses are in the standby mode, the apparatuses may wait until they receive the restart signal while maintaining minimum energy consumption.

The electronic apparatuses may be coupled to power supply apparatuses, such as an adaptor, and may be driven by the power received from the power supply apparatuses. The power supply apparatuses may convert the commercially available alternating current (AC) power into a voltage level necessary for the electronic apparatuses and provide the level-converted power to the electronic apparatuses.

In light of the prevalence of electronic apparatuses capable of having multiple power consumption profiles, such as the operating mode and the standby mode, there is a need for a method for efficiently supplying the power via the power supply apparatus in consideration of the power mode of a given electronic apparatus.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a power supply apparatus capable of determining a mode of an electronic apparatus, generating an output voltage according to the mode, and providing the output voltage to the electronic apparatus, and a power supply method thereof.

According to an aspect of an exemplary embodiment, there is provided a power supply apparatus which drives an electronic apparatus operating in one of a first mode and a second mode, the power supply apparatus including an input voltage generator configured to generate an input voltage by using an input alternating current (AC) voltage; an output voltage generator configured to generate a first output voltage by using the input AC voltage through pulse width modulation (PWM) control, and supply the first output voltage to the electronic apparatus: and a detector configured to determine a mode of the electronic apparatus by detecting a load of the electronic apparatus, and in response to the mode of the electronic apparatus changing from the first mode to the second mode, output a control signal, generated based on a mode change of the electronic apparatus, to the output voltage generator. The output voltage generator may be further configured to, in response to receiving the control signal, generate a second output voltage to corresponding to the second mode.

The first mode may be a standby mode and the second mode may be an operating mode.

The detector may be further configured to determine the mode of the electronic apparatus further based on a load current of the electronic apparatus.

The detector may be further configured to determine that the mode of the electronic apparatus has changed from the first mode to the second mode in response to the load current of the electronic apparatus reaching a threshold current level.

The output voltage generator may include a switching device, and generating the second output voltage may include adjusting a switching frequency of the switching device.

The detector may be further configured to output the control signal to the input voltage generator, and the input voltage generator may include a switch and generate the input voltage by performing a switching operation of the switch according to the control signal.

Performing the switching operation may include turning on the switch in response to the control signal received at the input voltage generator being a high-level signal, and turning off the switch in response to the control signal received at the input voltage generator being a low-level signal.

The input voltage generator may be further configured to, in response to the switch being turned off, perform half-wave rectification on the input AC power to generate the input voltage, and, in response to the switch being turned on, perform full-wave rectification on the input AC power to generate the input voltage.

The first output voltage may be equal to the second output voltage. The first output voltage may be lower than the second output voltage.

According to an aspect of an exemplary embodiment, there is provided a power supply method for controlling a power supply apparatus which drives an electronic apparatus operating in one of a first mode and a second mode, the method including generating an input voltage using an input alternating current (AC) voltage; generating a first output voltage by using the input AC voltage through pulse width modulation (PWM) control, and supplying the first output voltage to the electronic apparatus; determining a mode of the electronic apparatus by detecting a load of the electronic apparatus; and, in response to the mode of the electronic apparatus changing from the first mode to the second mode, generating a second output voltage corresponding to the second mode of the electronic apparatus.

The first mode may be a standby mode and the second mode may be an operating mode.

The mode of the electronic apparatus may be determined further based on a load current of the electronic apparatus.

The method may further include determining that the mode of the electronic apparatus has changed from the first mode to the second mode in response to the load current of the electronic apparatus reaching a threshold current level.

The power supply apparatus may include a switching device, and generating the second output voltage may include adjusting a switching frequency of the switching device.

The generating the input voltage may include performing a switching operation of a switch according to a control signal corresponding to the second mode.

The first output voltage may be equal to the second output voltage. The first output voltage may be lower than the second output voltage.

According to an aspect of an exemplary embodiment, there is provided a power supply apparatus configured to drive an electronic apparatus selectively operating in one of a first mode and a second mode. The power supply apparatus may include an output voltage generator configured to provide an output voltage to the electronic apparatus; and a load detector inductively coupled to the output voltage generator, the load detector configured to dynamically detect a load of the electronic apparatus based on a current provided to the electronic apparatus, determine an operational mode of the electronic apparatus in which the electronic apparatus consumes electricity by selectively operating components of the electronic apparatus associated with the operational mode from among a plurality of operational modes, and inductively output a control signal corresponding to the operational mode to the output voltage generator.

The output voltage generator may be further configured to detect the control signal inductively output by the load detector according to a corresponding inductive change, and dynamically adjust the output voltage to the electronic apparatus according to the operational mode indicated by the control signal.

The output voltage generator may include a switching device, and the dynamically adjusting the output voltage to the electronic apparatus may include adjusting a switching frequency of the switching device.

According to various exemplary embodiments, the power supply apparatus may autonomously determine a mode of an electronic apparatus without a signal separately provided from an external apparatus, generate an output voltage according to the mode of the electronic apparatus, and supply the output voltage to the electronic apparatus, and thus the efficient driving of the power supply apparatus may be possible.

Additional aspects and advantages of the exemplary embodiments are set forth in the detailed description, and will be obvious from the detailed description, or may be learned by practicing the exemplary embodiments.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

Figure 1:
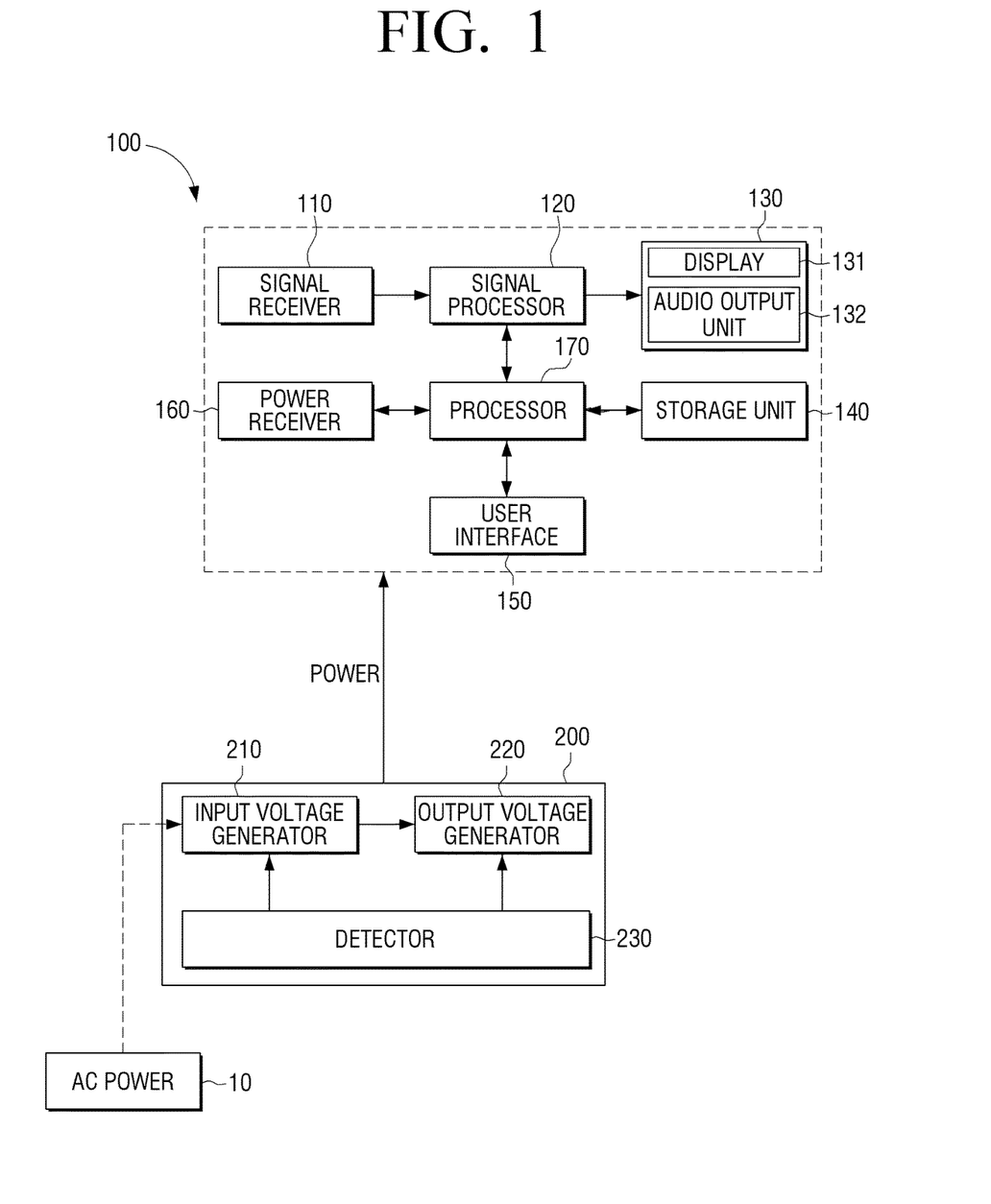
FIG. 1 is a diagram illustrating a power supply apparatus and an electronic apparatus which receives power from the power supply apparatus according to an exemplary embodiment.

FIG. 1 illustrates a power supply apparatus and an electronic apparatus that receives power from the power supply apparatus according to an exemplary embodiment.

An electronic apparatus 100 may be operated by receiving power from a power supply apparatus 200.

For example, the electronic apparatus 100 may be implemented with a monitor, a TV, or the like. The electronic apparatus 100 may receive and process a video signal and an audio signal using the power provided from the power supply apparatus 200 and output an image and an audio based on the processed video signal and audio signal.

In this example, the electronic apparatus 100 may include a signal receiver 110, a signal processor 120, an output unit 130, a storage unit 140, a user interface 150, a power receiver 160, and a processor 170.

The signal receiver 110 may receive the video signal and the audio signal from an external apparatus.

For example, the signal receiver 110 may receive a broadcast signal provided from a broadcasting station. In this example, the signal receiver 110 may be implemented to include a tuner (not shown), a demodulator (not shown), and an equalizer (not shown).

The signal receiver 110 may receive the video signal and the audio signal from an external medium, such as a Blu-ray disc player, a Digital Versatile Disc (DVD) player, a universal serial bus (USB) dongle, a High-Definition Multimedia Interface (HDMI) dongle, and an external hard disk drive, or download or stream video and audio signals via a network such as the Internet.

The signal processor 120 may perform processing on the video signal and the audio signal received from the signal processor 110.

For example, the signal processor 120 may perform various image processing tasks, such as decoding, scaling, noise filtering, frame rate conversion, and resolution conversion on the video signal. The video signal processed in the signal processor 120 may be output to a display 131.

The signal processor 120 may also perform various processing tasks, such as decoding, amplification, and noise filtering on the audio signal. The audio signal processed in the signal processor 120 may be output to an audio output unit 132.

The output unit 130 may include the display 131 and the audio output unit 132, and output the video signal and the audio signal processed in the signal processor 120.

The display 131 may display an image based on the video signal processed in the signal processor 120. The image may be a still or moving image. The display 131 may be implemented with a liquid crystal display (LCD), an organic light emitting diode (OLED), or the like.

The display 131 may further include additional components according to the implementation method. For example, in response to the display 131 being an LCD type, the display 131 may include an LCD display panel, a backlight unit configured to supply light to the LCD display panel, a panel driving board configured to drive the LCD display panel, and the like.

The audio output unit 132 may output the audio based on the audio signal processed in the signal processor 120. The audio output unit 132 may be implemented with an output terminal, a speaker, or the like which may output the audio.

The storage unit 140 may store a variety of data, such as an operating system (OS) software module for operating the electronic apparatus 100 or various programs. The storage unit 140 may include a nonvolatile memory, such as a flash memory, a hard disk drive, a solid-sate drive, and the like.

The user interface 150 may receive a user command for controlling the electronic apparatus 150.

For example, the user interface 150 may receive the user command through an operation panel or receive a user command input to a remote controller and provide the received user command to the processor 170.

The power receiver 160 may receive the power for driving the electronic apparatus 100.

For example, the power receiver 160 may be coupled to the power supply apparatus 200 and the power receiver 160 may receive the power provided from the power supply apparatus 200, convert or adjust the power to power having a power level necessary for operations of the components of the electronic apparatus 100, and supply the level-converted power to the components.

The processor 170 may control the overall operation of the electronic apparatus 100. The processor 170 may include a microcomputer (or microcomputer and central processing unit (CPU)), and a random access memory (RAM), and a read only memory (ROM) for the operation of the electronic apparatus 100.

The processor 170 may control the components of the electronic apparatus 100 so that the electronic apparatus 100 operates according to a power mode of the electronic apparatus 100.

The available power modes may include a standby mode and an operating mode. In the standby mode, the electronic apparatus 100 may not perform its main or core functions but it may continue to draw power from the power supply apparatus 200 until, for example, an input of a user command is received from an external apparatus. On the other hand, the electronic apparatus 100 may perform a function or operation in the operating mode. For example, displaying an image, outputting audio, changing channels, etc. may require the electronic apparatus 100 to be in the operating mode.

The processor 170 may further control the power receiver 160 to supply the power to those components of the electronic apparatus 100 that are required to operate in the standby mode when the electronic apparatus 100 is in the standby mode. The processor 170 may also control the power receiver 160 to supply the power to those components that are required to perform a function according to the user command.

For example, the processor 170 may control the electronic apparatus 100 to enter the standby mode state and use the limited power supplied from the power supply apparatus 200 in response to the electronic apparatus 100 being turned off, such that the power supply for other components would be interrupted and the power would be supplied only to the user interface 150 to receive a turn-on command from the user. Subsequently, in response to the turn-on command being input through the user interface 150, the processor 170 may cause the electronic apparatus 100 to enter the operating mode and control the power receiver 160 to supply more power to the components of the electronic apparatus 100 using the power supplied from the power supply apparatus 200 so that the image and audio may be output according to the turn-on command.

The load of the electronic apparatus 100 may increase in the operating mode compared to the standby mode. In other words, the power may be supplied to a minimum configuration of components in the standby mode while the power may be supplied to the components that are required to perform the appropriate function according to the user command For example, the power receiver 160 may supply power to only a limited set of components such as the processor 170 and the user interface 150 in the standby mode, thus causing the electronic apparatus 100 to exhibit a relatively low load. On the other hand, the power receiver 160 can supply power to every component in the electronic apparatus 100 when the electronic apparatus 100 enters the operating mode after receiving a "change channel" command from the user, in which case the electronic apparatus 100 will experience a relatively high load.

Accordingly, the power supply apparatus 200 according to an exemplary embodiment may determine which power mode the electronic apparatus 100 in—the standby mode or the operating mode—based on the load of the electronic apparatus 100. Based on this determination, the power supply apparatus 200 may supply to the electronic apparatus 100 power that corresponds to the determined mode.

For example, the power supply apparatus 200, implemented with an adapter, may receive an AC power 10 as commercial power, convert the AC power 10 into a voltage level necessary for the electronic apparatus 100, and supply the converted power to the electronic apparatus 100.

In this example, as illustrated in FIGS. 1 to 5, the power supply apparatus 200 may include an input voltage generator 210, an output voltage generator 220, and a detector 230.

Hereinafter, the power supply apparatus 200 will be described in detail with reference to FIGS. 1 to 5.

Figure 2:
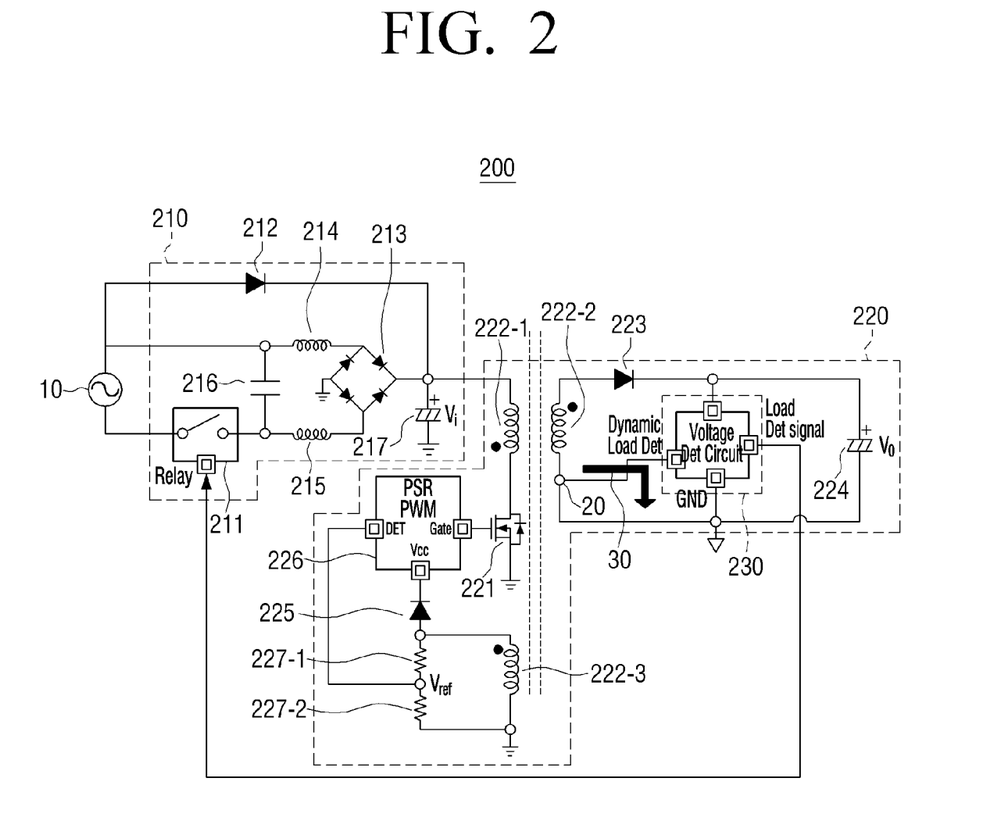
FIG. 2 is a circuit diagram illustrating a power supply apparatus according to an exemplary embodiment.

FIG. 2 is a circuit diagram illustrating a power supply apparatus according to an exemplary embodiment.

The input voltage generator 210 may generate an input voltage $V_i$ using the input AC power 10.

For example, the input voltage generator 210 may include a switch 211. The input voltage generator 210 may perform a switching operation of the switch 211 according to a control signal output from the detector 230 and generate a direct current (DC)-converted input voltage by rectifying a current of the AC power input according to the switching operation.

The control signal may be a signal corresponding to the power mode of the electronic apparatus 100. For example, the detector 230 may determine the power mode of the electronic apparatus 100 and control the switching operation of the switch 211 by outputting a signal corresponding to the power mode of the electronic apparatus 100 to the input voltage generator 210.

For example, the detector 230 may output a low level signal to the switch 211 upon determining that the electronic apparatus 100 is in the standby mode. Similarly, the detector 230 may output a high level signal to the switch 211 when it detects that the electronic apparatus 100 is in the operating mode. Accordingly, the switch 211 may be turned off when it is detected that the electronic apparatus 100 is in the standby mode, and the switch 211 may be turned on when it is detected that the electronic apparatus 100 is in the operating mode.

The input voltage generator 210 may generate the input voltage $V_i$ by performing half-wave rectification on the input AC power 10 in response to the switch 211 being turned off.

For example, in response to the switch 211 being turned off, a diode 212 may perform half-wave rectification on a current input from the AC power 10, and a capacitor 217 may generate the input voltage $V_i$ by smoothing and charging a DC voltage output from the diode 212.

On the other hand, in response to the switch 211 being turned on, the input voltage generator 210 may generate the input voltage $V_i$ by performing full-wave rectification on the input AC power 10.

For example, in response to the switch 211 being turned on, a bridge diode 213 may perform full-wave rectification on the current input from the AC power 10, and a capacitor 217 may generate the input voltage $V_i$ by smoothing and charging a DC voltage output from the bridge diode 213. Inductors 214 and 215 and a capacitor 216 may function as an LC resonance circuit to prevent an overvoltage from being applied to the bridge diode 213.

The output voltage generator 220 may generate an output voltage $V_o$ using the input voltage $V_i$ through pulse-width modulation (PWM) control and supply the generated output voltage $V_o$ to the electronic apparatus 100.

For example, the output voltage generator 220 may include a switching device 221, and the output voltage generator 220 may turn on the switching device 221 to certain frequency to generate the output voltage $V_o$ having a preset target voltage level. This can be accomplished by adjusting a duty cycle of the switching device 221, which is the proportion of the time that the switching device 221 maintains an "on" state to the regular time interval (i.e. one period). In other words, the duty cycle indicates the percentage of one period in which the switching device 221 is switched on.

The preset target voltage level may have the same value (for example, 14 V) in the standby mode and the operating mode of the electronic apparatus 100. That is, the output voltage generator 220 may generate the output voltage $V_o$ having the same voltage level in the standby mode and the operating mode of the electronic apparatus 100.

In response to the switching device 221 being turned on, the input voltage $V_i$ output from the capacitor 217 may be applied to a first primary coil 222-1 of a first transformer 222-1 and 222-2, and a certain voltage may be induced in a secondary coil 222-2 by the first primary coil 222-1 according to a turns ratio of the coils 222-1 and 222-2.

The diode 223 may rectify a voltage output from the secondary coil 222-2, and a capacitor 224 may supply the output voltage Vo to the electronic apparatus 100 by smoothing and charging the voltage output from the diode 223.

A certain voltage may be induced in a second primary coil 222-3 by a secondary coil 222-2 of a second transformer 222-2 and 222-3. A diode 225 may rectify the voltage induced in the second primary coil 222-3 and output the rectified voltage as a driving power of a PWM circuit 226.

A voltage divider 227-1 and 227-2 may include resistors 227-1 and 227-2 coupled in series, and the voltage divider 227-1 and 227-2 may generate a reference voltage $V_{ref}$ by dividing the voltage induced in the second primary coil 222-3 and output the reference voltage $V_{ref}$ to the PWM circuit 226.

The PWM circuit 226 may adjust the duty cycle of the switching device 221 by comparing the reference voltage $V_{ref}$ with a preset voltage level, and control the output voltage to have the preset target voltage level according to the adjusted duty cycle. The PWM circuit 226 may control the output voltage $V_o$ to be maintained at the preset target voltage level by turning on the switching device 221 to certain frequency such that the output voltage $V_o$ gradually drops in response to the switching device 221 being turned off.

The output voltage generator 220 may use the input voltage $V_i$ to generate the output voltage $V_o$ having the preset target voltage level.

The detector 230 may determine the power mode of the electronic apparatus 100 by detecting the load of the electronic apparatus 100.

As described above, the electronic apparatus 100 may supply the power to only the minimum number of components required in the standby mode in response to the electronic apparatus 100 entering the standby mode. The electronic apparatus 100 may supply the power to the components required to perform the function according to the user command in response to the electronic apparatus entering the operating mode state.

Accordingly, the load of the electronic apparatus 100 may increase in the operating mode compared to the standby mode. Thus, the load current may further increase in the operating mode.

The detector 230 may determine the power mode of the electronic apparatus 100 based on the load current of the electronic apparatus 100. That is, the detector 230 may determine the power mode of the electronic apparatus 100 based on the amount of electrical current provided to the electronic apparatus 100.

For example, the detector 230 may detect the load current of the electronic apparatus 100 and determine that the electronic apparatus 100 is in the standby mode based on the observation that the load current of the electronic apparatus 100 is lower than the preset current level. By the same token, the detector 230 may determine that the electronic apparatus 100 is in the operating mode when the load current of the electronic apparatus 100 is higher than the preset current level.

As the load current of the electronic apparatus 100 increases to approach or reach a preset current level, the detector 230 may determine that the power mode of the electronic apparatus 100 has changed from a first mode to a second mode. In contrast, as the load current of the electronic apparatus 100 decreases to approach or reach the preset current level, the detector 230 may determine that the mode of the electronic apparatus 100 has changed from the second mode to the first mode. The preset current level may be a threshold value predetermined by a user.

The first mode may be a standby mode and the second mode may be the operating mode.

In response to the mode change in the electronic apparatus 100, the detector 230 may output to the output voltage generator 200 a control signal according to the mode change That is, in response to the mode of the electronic apparatus 100 changing from the first mode to the second mode or vice versa, the detector 230 may output the control signal according to the mode change to the output voltage generator 220. The first mode may be the standby mode and the second mode may be the operating mode.

For example, one end 20 of the secondary coil 222-2 may be coupled to a ground terminal GND through an internal circuit of the detector 230. In response to the mode change of the electronic apparatus 100 from the standby mode to the operating mode or vice versa, the detector 230 may allow the one end 20 of the secondary coil 222-2 to be spontaneously short-circuited to the ground terminal GND by performing a switching operation of the internal circuit (Dynamic Load Detection 30 in FIG. 2).

Accordingly, the voltage level applied to the secondary coil 222-2 may spontaneously change, and consequently the voltage level induced in the second primary coil 222-3 by the secondary coil 222-2 may also spontaneously change. Accordingly, the PWM circuit 226 may, based on the change of the voltage level induced in the second primary coil 222-3, determine that the mode of the electronic apparatus 100 has changed.

In response to the mode change of the electronic apparatus 100, the detector 230 may output a control signal (e.g., wake up signal) in order to indicate the mode change to the output voltage generator 220.

The output voltage generator 220 may generate the output voltage $V_o$ to correspond to the new mode of the electronic apparatus 100 based on the control signal generated according to the mode change.

For example, in response to the control signal according to the mode change being received, the output voltage generator 220 may generate the output voltage $V_o$ that corresponds to the new mode of the electronic apparatus 100 by adjusting the switching frequency of the switching device 221.

In this example, it may be assumed that the mode of the electronic apparatus 100 has changed from the first mode to the second mode, that is, from the standby mode to the operating mode.

Upon receiving the control signal generated according to the mode change, the output voltage generator 220 may generate the output voltage $V_o$ that corresponds to the second mode (i.e., operating mode) by adjusting the switching frequency of the switching device 221.

That is, when the electronic apparatus 100 changes from the standby mode to the operating mode, the load of the electronic apparatus 100 may increase and the load current may also increase. Accordingly the output voltage $V_o$ may be temporarily reduced.

The output voltage generator 220 may increase the switching frequency of the switching device 221 when the electronic apparatus 100 is no longer in the standby mode such that the reduced output voltage $V_o$ is once again raised to the preset target voltage level. That is, the output voltage generator 220 may control the switching device 221 to be in a normal operation switching mode instead of a low-power operation switching mode.

In another example, it may be assumed that the electronic apparatus 100 has changed from the second mode to the first mode, that is, from the operating mode to the standby mode.

Upon receiving the control signal generated according to this mode change, the output voltage generator 220 may generate the output voltage $V_o$ that corresponds to the first mode (i.e., standby mode) by adjusting the switching frequency of the switching device 221.

That is, when the electronic apparatus 100 changes from the operating mode to the standby mode, the load of the electronic apparatus 100 may decrease and the load current may also decrease.

Accordingly, the output voltage generator 220 may reduce the switching frequency of the switching device 221 when the electronic apparatus 100 is no longer in the operating mode such that the output voltage $V_o$ is maintained at the preset target voltage level. That is, the output voltage generator 220 may control the switching device 221 to be in a low-power operation switching mode instead of a normal operation switching mode.

The detector 230 may output the control signal, which corresponds to the power mode of the electronic apparatus 100, to the input voltage generator 210 (Load Detection Signal of FIG. 2).

For example, the detector 230 may output a low-level signal to the switch 211 in response to the electronic apparatus 100 being in the standby mode, or output a high-level signal to the switch 211 in response to the electronic apparatus 100 being in the operating mode.

Accordingly, the input voltage generator 210 may generate the input voltage by performing the switching operation of the switch 211 according to the control signal corresponding to the mode of the electronic apparatus 100.

For example, the input voltage generator 210 may turn off the switch 211 in response to the low-level signal being input from the detector 230, or turn on the switch 211 the high-level signal being input from the detector 230.

The input voltage generator 210 may generate the input voltage $V_i$ using the diode 212 when the switch 211 is turned off, or generate the input voltage $V_i$ using the bridge diode 213 when the switch 211 is turned on.

Accordingly, in response to the mode of the electronic apparatus 100 being the standby mode state, the number of components used to generate the input voltage may decrease, and the power consumed by the power supply apparatus 200 may also decrease.

Figure 3:
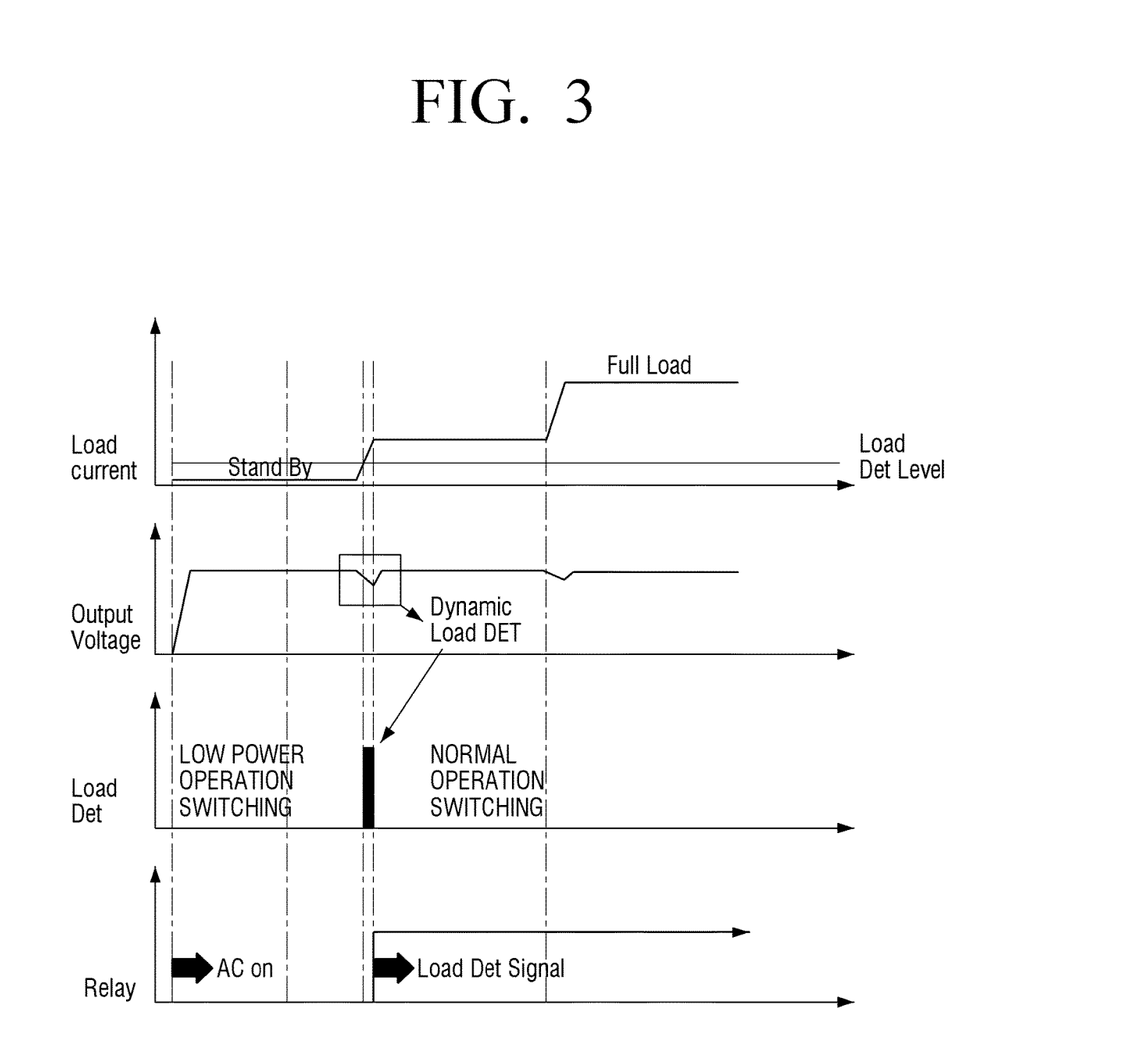
FIG. 3 is a sequence diagram illustrating an operation of a power supply apparatus according to an exemplary embodiment.

FIG. 3 is a sequence diagram illustrating an operation of a power supply apparatus according to an exemplary embodiment.

Referring to FIG. 3, in response to the power supply apparatus 200 being coupled to the electronic apparatus 100, the power supply apparatus 200 may generate the output voltage using the input AC power and provide the generated output voltage to the electronic apparatus 100.

In response to the electronic apparatus 100 operating in the standby mode, the power supply apparatus 200 may output a low-level signal to the switch 211 in the input voltage generator 210 to turn off the switch 211 and generate the output voltage $V_o$ having the preset target voltage level based on the reference voltage $V_{ref}$.

The load current of the electronic apparatus 100 may be relatively low, in that the electronic apparatus 100 may consume minimum power according to the standby mode (Stand By in FIG. 3).

In response to the electronic apparatus 100 switching from the standby mode to the operating mode, the load of the electronic apparatus 100 may increase and the load current may also increase.

While the power supply apparatus 200 detects and monitors the load current level of the electronic apparatus 100, it may determine that the electronic apparatus 100 has changed from the standby mode to the operating mode in response to the load current of the electronic apparatus 100 rising to a preset current level (Load Det Level of FIG. 3).

The power supply apparatus 200 may output a high-level signal to the switch 211 in the input voltage generator 210 in order to turn on the switch 211 (Load Detection signal of FIG. 3).

The power supply apparatus 200 may then raise the reduced output voltage $V_o$ back to the preset target voltage level based on the reference voltage $V_{ref}$, such that the output voltage $V_o$ increases in response to the increase in the load current of the electronic apparatus 100.

For example, the detector 230 in the power supply apparatus 200 may perform Dynamic Load Detection from the moment of detecting the mode change to a time of a rise in the output voltage $V_o$. The output voltage generator 220 may once again increase the output voltage $V_o$ to the preset target voltage level by switching the switch 221 from the low power operation to the normal operation according to the Dynamic Load Detection.

The electronic apparatus 100 may consume maximum power in the operating mode when it is to perform a function according to a user command The load current of the electronic apparatus 100 may increase to a maximum current level (Full Load of FIG. 3), and thus the output voltage $V_o$ may be reduced.

Accordingly, the power supply apparatus 200 may increase the reduced output voltage $V_o$ to the preset target voltage level again based on the reference voltage $V_{ref}$.

It has been described in FIGS. 2 and 3 that the power supply apparatus 200 may generate the output voltage having the same voltage level in the standby mode state and the operating mode state of the electronic apparatus 100.

However, this is merely exemplary, and the power supply apparatus 200 may generate the output voltage having different voltage levels according to the mode of the electronic apparatus 100 and supply the generated output voltage to the electronic apparatus 100. Detailed description thereof will be made with reference to FIGS. 4 and 5.

Figure 4:
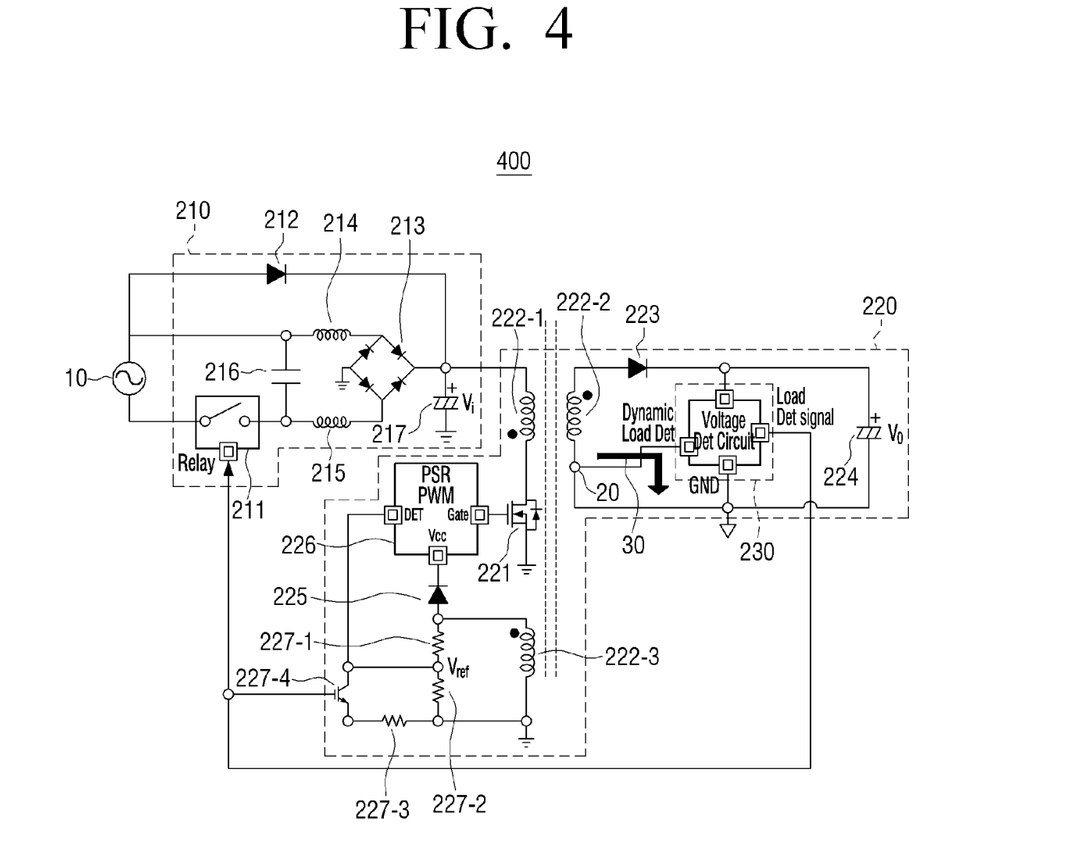
FIG. 4 is a circuit diagram illustrating a power supply apparatus according to another exemplary embodiment.

FIG. 4 illustrates a circuit diagram of a power supply apparatus according to another exemplary embodiment.

Referring to FIG. 4, a power supply apparatus 400 of FIG. 4 is the same as the power supply apparatus 200 of FIG. 2 other than the addition of a resistor 227-3 and a switching device 227-4 to the power supply apparatus 200 of FIG. 2. Thus, detailed description for the portion of the power supply apparatus 200 reoccurring in the power supply apparatus 400 of FIG. 4 may also apply to the power supply apparatus 400 of FIG. 4.

A switching operation of the switching device 227-4 may be controlled according to a control signal corresponding to the power mode of the electronic apparatus 100 and output from a detector 230.

For example, the detector 230 may output a low-level signal to the switching device 227-4 when the electronic apparatus 100 is in the standby mode. Similarly, the detector 230 may output a high-level signal to the switching device 227-4 when the electronic apparatus 100 is in the operating mode.

Accordingly, the switching device 227-4 may be turned off when the electronic apparatus 100 is in the standby mode, and the switching device 227-4 may be turned on when the switching device 227-4 is in the operating mode.

In response to the switching device 227-4 being turned off, a PWM circuit 226 may adjust a duty cycle of a switching device 221 by comparing a reference voltage $V_{ref}$ with a preset voltage level, and control an output voltage $V_o$ to conform to a preset target voltage level based on the adjusted duty cycle.

The PWM circuit 226 may generate the output voltage $V_o$ having a lower voltage level than the output voltage $V_o$ of FIG. 2. For example, in response to the mode of the electronic apparatus 100 being the standby mode, the PWM circuit 226 of FIG. 4 may generate the output voltage $V_o$ having a voltage level lower than 14 V, which is the exemplary output voltage $V_o$ in FIG. 2.

The reference voltage $V_{ref}$ may have a lower voltage level when the switching device 227-4 is turned on than when the switching device 227-4 is turned off because the resistors 227-2 and 227-3 are coupled in parallel when the switching device 227-4 is turned on, thus decreasing the value of $V_{ref}$. In other words, when the switching device 227-4 is turned on, the PWM circuit 266 may cause the output voltage $V_o$ to rise to a higher level than when the switching device 227-4 is turned off because the reference voltage $V_{ref}$, which is compared against the preset target voltage level, is now only a fraction of what it would have been had the switching device 227-4 been off.

Accordingly, the PWM circuit 226 may output the output voltage $V_o$ having the same voltage level as the output voltage $V_o$ of FIG. 2 by comparing the reference voltage $V_{ref}$ with the preset voltage level.

However, the output voltage may be lowered in the first mode than the output voltage in the second mode. That is, the output voltage may be adjusted such that it is lower in the standby mode than it is in the operating mode.

Accordingly, in response to the mode of the electronic apparatus 100 being the standby mode, the power consumed in the power supply apparatus 400 may be further reduced.

Figure 5:
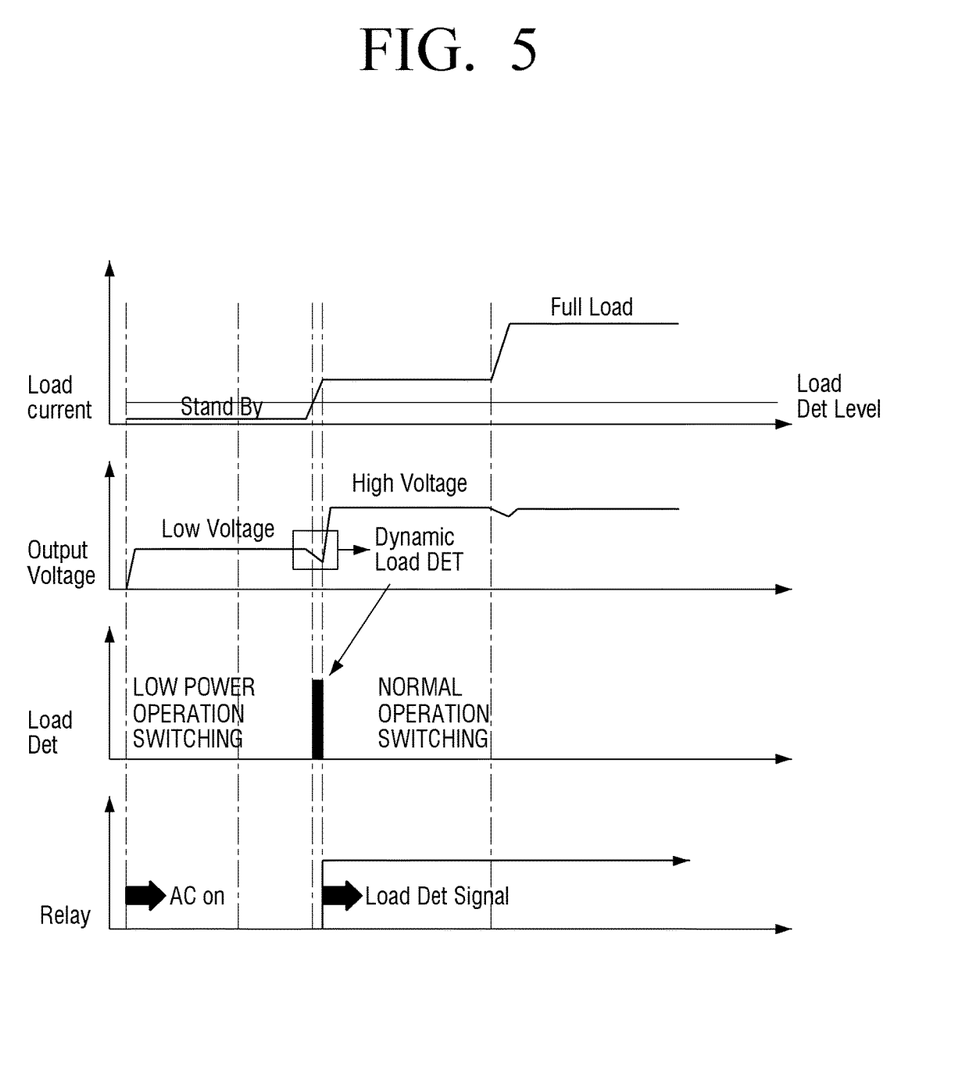
FIG. 5 is a sequence diagram illustrating an operation of a power supply apparatus according to another exemplary embodiment.

FIG. 5 is a sequence diagram illustrating an operation of a power supply apparatus according to another exemplary embodiment.

Detailed description for a portion of an operation in FIG. 3 that overlaps the operation in FIG. 5 may be applied to FIG. 5. FIG. 5 illustrates the operation of the power supply apparatus 400 illustrated in FIG. 4.

Referring to FIG. 5, in response to the mode of the electronic apparatus 100 being the standby mode, the power supply apparatus 200 may generate the output voltage $V_o$ having the lower voltage level than that in FIG. 3 (Low Voltage of FIG. 5).

In response to the mode of the electronic apparatus 100 changing from the standby mode to the operating mode, the power supply apparatus 200 may generate the output voltage $V_o$ having the same level as that in FIG. 3 (High Voltage of FIG. 5).

In response to the electronic apparatus 100 changing from the standby mode to the operating mode, the power supply apparatus 200 may increase the output voltage $V_o$ in two stages by generating the output voltage $V_o$ having a relatively low voltage level in the standby mode of the electronic apparatus 100 and generating the output voltage $V_o$ having a relatively high voltage level in the operating mode of the electronic apparatus 100.

Figure 6:
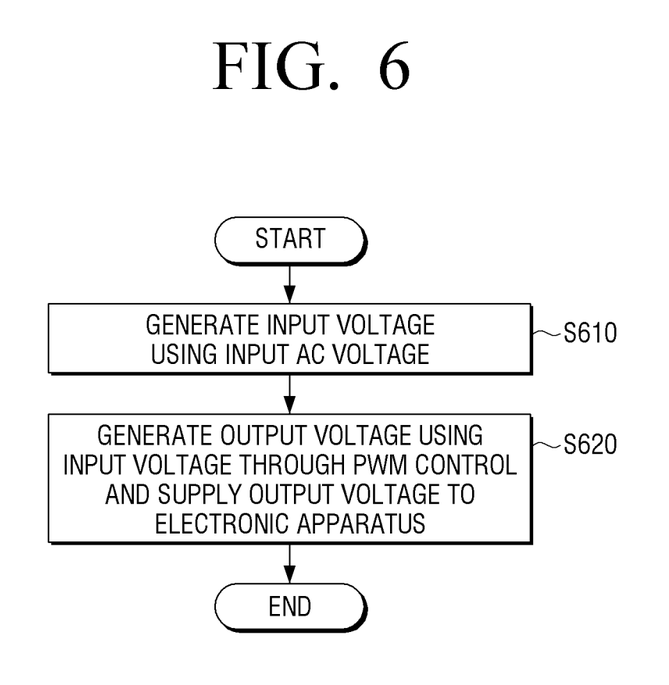
FIG. 6 is a flowchart illustrating a method for controlling a power supply apparatus according to an exemplary embodiment.

FIG. 6 is a flowchart illustrating a method for controlling a power supply apparatus according to an exemplary embodiment.

The power supply apparatus may generate an input voltage using an input AC voltage (S610).

The power supply apparatus may generate an output voltage using the input voltage through PWM control and supply the generated output voltage to an electronic apparatus (S620). The electronic apparatus may operate in a first mode or a second mode. For example, the first mode may be a standby mode and the second mode may be an operating mode.

For example, in operation S620, the power supply apparatus may determine the mode of the electronic apparatus by detecting a load of the electronic apparatus. In response to the mode change of the electronic apparatus, the power supply apparatus may generate the output voltage to correspond to the changed mode of the electronic apparatus based on a control signal according to the mode change.

The power supply apparatus may determine the mode of the electronic apparatus according to a load current of the electronic apparatus.

In response to the load current of the electronic apparatus increasing to approach or reach a preset current level, the power supply apparatus may determine that the mode of the electronic apparatus has changed from the first mode to the second mode.

In operation S620, in response to the control signal being received, the power supply apparatus may generate the output voltage corresponding to the mode of the electronic apparatus by adjusting a switching frequency of a switching device thereof.

In operation S610, the power supply apparatus may generate the input voltage by performing a switching operation of a switch thereof according to the control signal corresponding to the mode of the electronic apparatus.

The output voltage generated in the power supply apparatus in the first mode may be the same as the output voltage generated in the power supply apparatus in the second mode or the output voltage generated in the power supply apparatus in the first mode may be lower than the output voltage generated in the power supply apparatus in the second mode.

The detailed operation method of the power supply apparatus has been described with reference to FIGS. 1 to 5.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A power supply apparatus which drives an electronic apparatus, the power supply apparatus comprising:
   an input voltage generator configured to generate an input voltage using an input alternating current (AC) voltage;
   an output voltage generator configured to generate an output voltage using the input AC voltage through pulse width modulation (PWM) control, and supply the output voltage to the electronic apparatus; and
   a detector configured to:
      identify a mode of the electronic apparatus based on a load of the electronic apparatus, and
      output, in response to a mode of the electronic apparatus changing from a standby mode to an operating mode, a control signal to the output voltage generator,
   wherein the detector identifies that the mode of the electronic apparatus changes from the standby mode to the operating mode if the load of the electronic apparatus is greater than a predetermined level,
   wherein the output voltage generator generates a first output voltage corresponding to the operating mode based on the control signal, and
   wherein the first output voltage is greater than a second output voltage corresponding to the standby mode.

2. The power supply apparatus as claimed in claim 1, wherein the detector is configured to determine the mode of the electronic apparatus further based on a load current of the electronic apparatus.

3. The power supply apparatus as claimed in claim 2, wherein the detector is further configured to determine that the mode of the electronic apparatus has changed from the standby mode to the operating mode in response to the load current of the electronic apparatus reaching a threshold current level.

4. The power supply apparatus as claimed in claim 1, wherein the output voltage generator includes a switching device, and generating the first output voltage comprises adjusting a switching frequency of the switching device.

5. The power supply apparatus as claimed in claim 1, wherein the detector is further configured to output the control signal to the input voltage generator, and wherein the input voltage generator comprises a switch and generates the input voltage by performing a switching operation of the switch according to the control signal.

6. The power supply apparatus as claimed in claim 5, wherein performing the switching operation comprises turning on the switch in response to the control signal received at the input voltage generator being a high-level signal, and turning off the switch in response to the control signal received at the input voltage generator being a low-level signal.

7. The power supply apparatus as claimed in claim 6, wherein the input voltage generator is further configured to:
   in response to the switch being turned off, perform half-wave rectification on the input AC voltage to generate the input voltage, and
   in response to the switch being turned on, perform full-wave rectification on the input AC voltage to generate the input voltage.

8. A method for controlling a power supply apparatus which drives an electronic apparatus, the method comprising:
   generating an input voltage using an input alternating current (AC) voltage;
   generating an output voltage by using the input AC voltage through pulse width modulation (PWM) control, and supplying the output voltage to the electronic apparatus;
   identifying a mode of the electronic apparatus based on a load of the electronic apparatus; and
   generating, in response to the mode of the electronic apparatus changing from a standby mode to an operating mode, a first output voltage corresponding to the operating mode of the electronic apparatus,
   wherein the identifying the mode of the electronic apparatus comprises identifying that the mode of the electronic apparatus changes from the standby mode to the operating mode if the load of the electronic apparatus is greater than a predetermined level, and
   wherein the first output voltage is greater than a second output voltage corresponding to the standby mode.

9. The method as claimed in claim 8, wherein the mode of the electronic apparatus is determined further based on a load current of the electronic apparatus.

10. The method as claimed in claim 9, further comprising determining that the mode of the electronic apparatus has changed from the standby mode to the operating mode in response to the load current of the electronic apparatus reaching a threshold current level.

11. The method as claimed in claim 8, wherein the power supply apparatus comprises a switching device, and wherein the generating the first output voltage comprises adjusting a switching frequency of the switching device.

12. The method as claimed in claim 8, wherein the generating the input voltage comprises performing a switching operation of a switch according to a control signal corresponding to the second mode.

13. A power supply apparatus configured to drive an electronic apparatus selectively operating in one of a first mode and a second mode, the power supply apparatus comprising:
   an output voltage generator configured to provide an output voltage to the electronic apparatus;

a load detector inductively coupled to the output voltage generator, the load detector configured to dynamically detect a load of the electronic apparatus based on a current provided to the electronic apparatus, determine an operational mode of the electronic apparatus in which the electronic apparatus consumes electricity by selectively operating components of the electronic apparatus associated with the operational mode from among a plurality of operational modes, and inductively output a control signal corresponding to the operational mode to the output voltage generator, wherein the output voltage generator is further configured to detect the control signal inductively output by the load detector according to a corresponding inductive change, and dynamically adjust the output voltage to the electronic apparatus according to the operational mode indicated by the control signal, wherein the load detector identifies that the mode of the electronic apparatus changes from a standby mode to the operational mode if the load of the electronic apparatus is greater than a predetermined level, and outputs a first control signal to the output voltage generator, wherein the output voltage generator generates a first output voltage corresponding to the operational mode based on the first control signal, and wherein the first output voltage is greater than a second output voltage corresponding to the standby mode.

14. The power supply apparatus as claimed in claim 13, wherein the output voltage generator comprises a switching device, and the dynamically adjusting the output voltage to the electronic apparatus comprises adjusting a switching frequency of the switching device.

* * * * *